FOURIER SYNTHESIS OF COMPLEX WAVES

Filed Feb. 26, 1968 4 Sheets-Sheet 1

INVENTOR
MYRON ECKHART, Jr.

BY Albert Sopp
O. P. Hodges
ATTORNEYS

FOURIER SYNTHESIS OF COMPLEX WAVES

Filed Feb. 26, 1968 4 Sheets-Sheet 2

INVENTOR
MYRON ECKHART, Jr.

BY

ATTORNEYS

INVENTOR
MYRON ECKHART, Jr.
BY Albert Sopp
D. E. Hodges
ATTORNEYS

INVENTOR
MYRON ECKHART, Jr.
BY
ATTORNEYS

United States Patent Office 3,488,862

Patented Jan. 13, 1970

3,488,862

FOURIER SYNTHESIS OF COMPLEX WAVES

Myron Eckhart, Jr., 1507 N. Edison St., Arlington, Va. 22205

Filed Feb. 26, 1968, Ser. No. 708,215
Int. Cl. C09b 23/06; H03k 5/00
U.S. Cl. 35—19 10 Claims

ABSTRACT OF THE DISCLOSURE

A system for deriving and displaying selected complex waves from Fourier series components in which pulse and logic switching elements are almost exclusively employed to provide frequency countdown from higher harmonics as well as positive and accurate synchronization and phase stability in the system.

The invention described herein may be manufactured and used by or for the Government of the United States of America for governmental purposes without the payment of any royalties thereon or therefor.

BACKGROUND AND SUMMARY

An important educational technique particularly in the sciences is to afford understandable demonstration of mathematical concepts. Of continuing interest is the demonstration of the formation of a complex wave by components of the Fourier series. Previous attempts have usually met with difficulty because of lack of reliability and repeatability in the designed equipment thus rendering continuing class room demonstration unreliable.

For example, some prior art approaches have been directed to the generation of sine waves as a first step. The sine waves are next phase displaced and frequency shifted, and then later recombined to form a complex wave. Proper phase and frequency controls are very difficult in such an order of events because of the relatively slowly changing values in the sinusoidal waves. Phase instability has also restricted the number of harmonic components to provide convincing educational demonstrations.

The system of the present invention employs a self-synchronized trigger section energized by one source of oscillations to provide accurately related time pulses which in turn activate a self-synchronized rectangular function section. The rectangular functions section provides rectangular waves accurately related in phase and polarity to provide synchronized instructions or control voltages to selectively activate desired ones of a bank of tuned amplifiers. The selectively activated tuned amplifiers provide the sinusoidal Fourier series harmonic components for the desired complex wave to be displayed. The outputs of the tuned amplifiers are amplitude controlled, metered and summed, as desired, for transmission as a complex wave signal to a display device such as an oscilloscope.

The employment of externally and internally synchronized pulse and logic type switching devices in the trigger and rectangular function sections of the system enables accurate and repeatable production of Fourier series wave components without phase shifting and frequency drifting. Therefore, the complex waves to be displayed are capable of being reliably repeated for successive demonstration.

Accordingly, the objects of the present invention include the provision of: A system to produce from Fourier series components complex waveforms for educational display; a phase-accurate complex wave display system capable of convincing demonstration and of high reliability and economy of operation; a complex wave synthesizing and display system employing relatively inexpensive switching units of high reliability and low cost. A feature of the present invention is the advantageous arrangement of flip-flops devices to provide rectangular waveforms locked in phase quadrature at the fundamental and at each harmonic frequency for accurate selection of each Fourier series component comprising part of the displayed complex wave.

BRIEF DESCRIPTION OF THE DRAWINGS

The above and other objects, features and advantages of the present invention will be better understood by reference to the accompanying drawings in which like reference numerals indicate like parts and in which.

DETAILED DESCRIPTION

Figure 1:
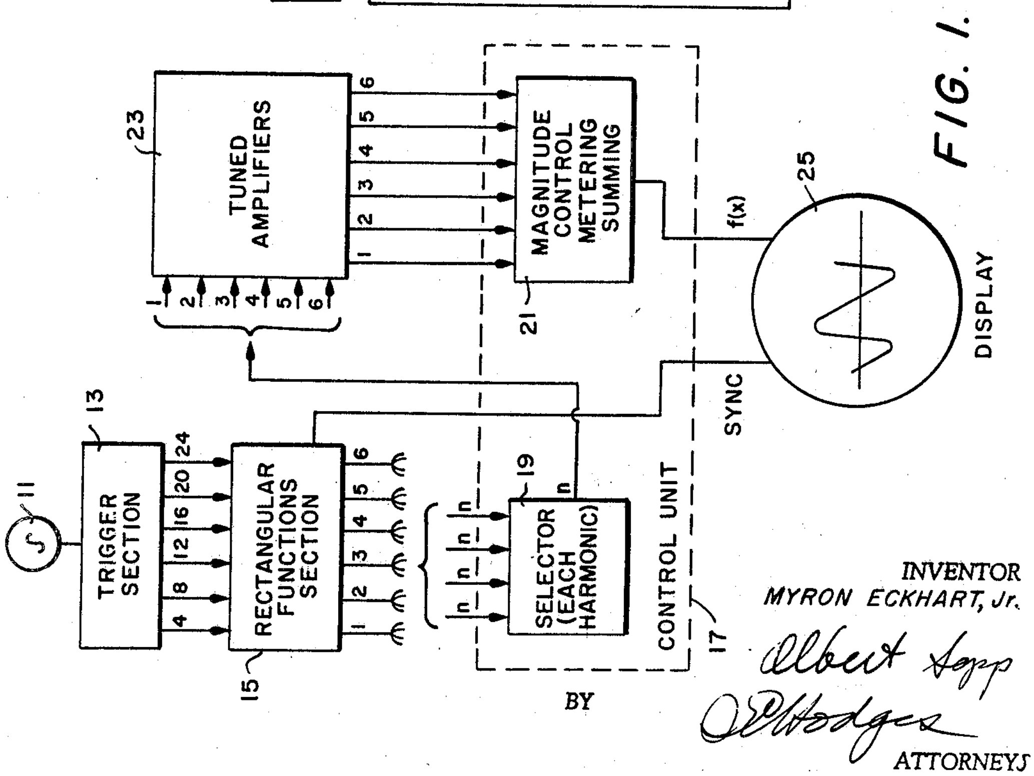
FIG. 1 is a system block diagram of the invention as a whole.

Referring to FIG. 1 the system of the invention comprises a source of oscillation 11 which may conveniently be chosen as 240 kHz. (kilohertz) although other divisible frequencies may be employed. The source 11 drives a trigger section 13 shown for purposes of illustration as providing respective parallel channel outputs at submultiple frequencies of 4, 8, 12, 16, 20 and 24 kHz. by counting down from 240 kHz. These outputs are fed to a rectangular functions section 15 which produces phase quadrature related rectangular waves at frequencies of 1, 2, 3, 4, 5 and 6 kHz., i.e. at frequencies ¼ those of the outputs of the trigger section. The respective frequencies 1–6 kHz. are derived from the frequencies 4–24 kHz. by further division inherent in the rectangular functions section.

A control unit 17 has a selector section 19 and a control and summing section 21. The selector section 19 has a switch unit for selecting one phase of each of the phase quadrature waves for each frequency 1–6 kHz. from the rectangular functions section 15. Selected phases provide one of the phase quadrature components, +sin, +cos, −sin, or −cos, of the wave for each frequency 1–6 kHz., as desired.

Selected ones of the phases of each wave are fed from the rectangular functions section to respective ones of a bank 23 of tuned amplifiers each of which provides sinusoidal wave at the selected phase and frequency, e.g. sin X, cos 2X, −sin 3X, etc., where X represents the frequency time function, thereby providing the appropriate desired Fourier components to be displayed individually or as part of the complex wave $f(x)$. The outputs of the selected tuned amplifier are then amplitude adjusted and summed in the control unit 21 and fed to a suitable output display device such as an oscilloscope 25. External synchronization for oscilloscope 25 is provided by suitable output from the phase locked rectangular functions section 15. There are provided in this system sufficient Fourier components to produce demonstratively convincing complex waves such as for example, the saw tooth wave illustratively shown on the oscilloscope 25.

Figure 2:
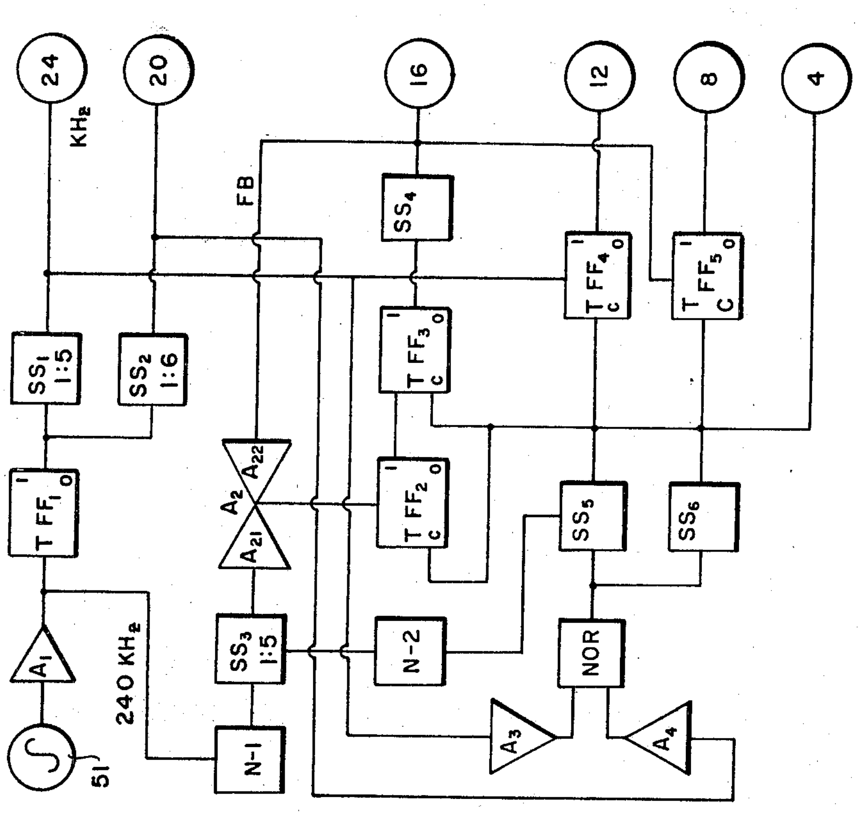
FIG. 2 is a schematic block diagram of the trigger section of the system according to the invention.
Figure 5:
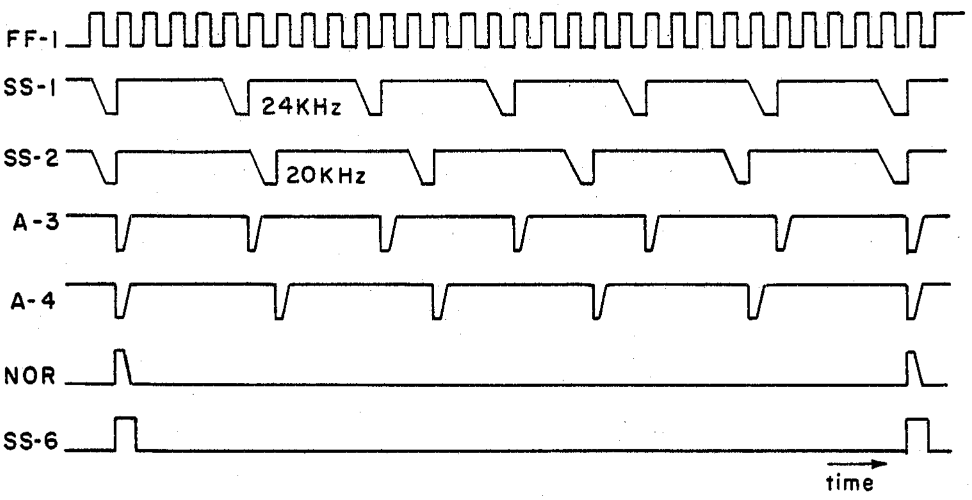
FIGS. 5–7 are explanatory pulse-waveform diagram for explaining the invention in connection with FIGS. 1–4.
Figure 6:
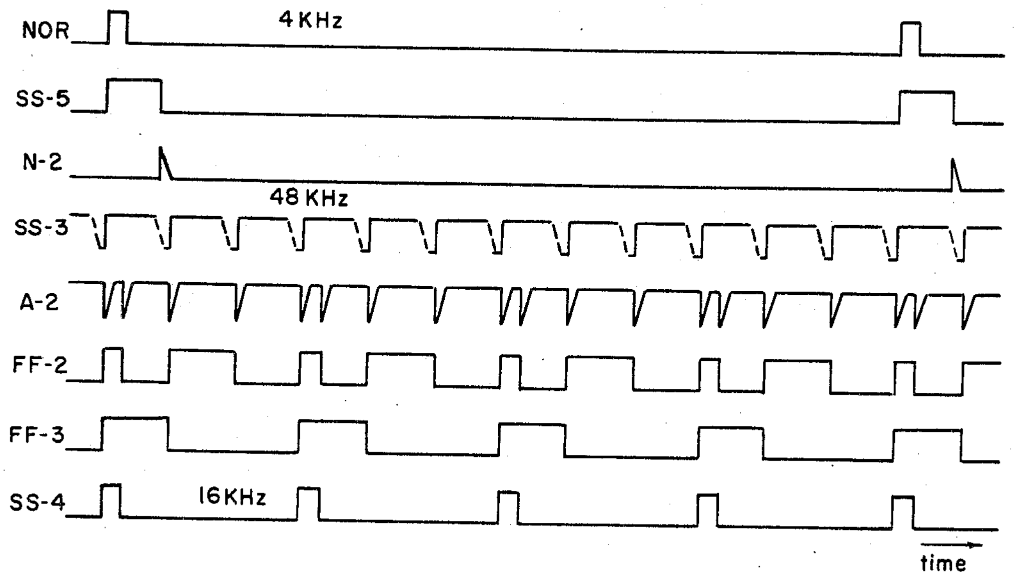

Referring to FIG. 2 and the pulse diagrams of FIGS. 5 and 6, a crystal oscillator 51 of any suitable well-known design provides pulses at 240 kHz. via an inverter/amplifier A–1 in a first path to triggering input T of a flip-flop FF–1 which divides the 240 kHz. frequency down to 120 kHz. The 120 kHz. pulses are fed to a single shot multivibrator SS–1 which is adjusted in a well known manner to respond to input pulse leading edges to produce a pulse output for every 5 input pulses as indicated, thereby providing pulses at 24 kHz. at output.

A second output from the flip-flop FF–1 is fed to a single-shot device SS–2 providing a 1:6 countdown to produce output pulses at 20 kHz. as indicated. The 24 and 20 kHz. pulses at the outputs of SS–1, SS–2, are shown in the pulse diagram of FIG. 5 in relation to the 120 kHz. output of FF–1.

The 240 kHz. oscillations are applied via a second path from A–1 to an inverter N–1 to provide leading edge pulse activation for a single shot multivibrator SS–3 producing a divide-by-five countdown to 48 kHz. as shown in the SS–3 output pulse portion of FIG. 6. The 48 kHz. pulses provide the genesis of the 16 and 8 kHz. pulses as will be explained later.

The 4 kHz. pulses are derived as follows: The 24 and 20 kHz. outputs from SS–1 and SS–2 respectively, are fed to amplifier-inverter A–3 and A–4 to produce the negative pulses so legended in FIG. 5. The negative pulses provide suitable means to energize the legended NOR-Gate when the outputs of A–3 and A–4 are concurrent. In effect the 24 and 20 kHz. pulses are "beat together" to produce at the output of the NOR the desired 4 kHz. pulses which are suitably widened by SS–6 and thence fed to an output terminal.

For the production of 12, 16 and 8 kHz., the 24 kHz pulses from SS–1 are fed to the triggering side T of a flip-flop FF–4 which inherently divides said pulses by 2 to provide the desired 12 kHz. pulses.

To provide pulses at 16 kHz., pulses at 48 kHz from SS–3 are fed to one input half A–21 of amplifier A–2. However, 4 kHz. synchronizing pulses for the SS–3 as shown in FIG. 6 are delayed by means of a single-shot multivibrator SS–5 receiving 4 kHz. from the NOR-gate. The pulses from SS–5 are fed via an inverter N–2 to produce the delayed 4 kHz. spikes shown in FIG. 6 as the output of N–2. The N–2 spikes synchronize the action of SS–3 producing the 48 kHz. pulses and limit synchronization error to a count of one at most. The N–2 pulse serves to actively discharges the timing capacitor in SS–3.

Two flip-flops FF–2 and FF–3 receiving the output of A–2 form a 1:3 serial counter of well-known design thus dividing the 48 kHz. into a 16 kHz. pulse train. The waveforms at FF–2 and FF–3 are shown in FIG. 6. The 16 kHz. output is fed to a single-shot device SS–4 which provides desired pulse width for feed back delay to a second amplifier A–22. The second pulse of the pulse pairs occurring at every third pulse from A–2, thereby forming the means to shut off FF–2 before the arrival of a further pulse from A–2 to provide the serial counting at 1:3.

In order to produce pulses at 8 kHz. the 16 kHz. output of SS–4 is applied as an input to the triggering input of a flip-flop FF–5 which inherently divides by 2 to produce 8 kHz. as indicated.

The channels producing the 16, 12 and 8 kHz. pulses are further positively synchronized within the trigger section by means of pulses from the single-shot multivibrator SS–6 applied in parallel to the reset or *c* input terminals of the 16 kHz. flip-flops FF–2 and FF–3, and of the 12 kHz. and 8 kHz. flip-flops FF–4 and FF–5 respectively.

It can now be observed that the trigger section 13 of the system is synchronized within itself in a fail-safe manner. That is, as long as SS–1 and SS–2 produce pulses at 24 and 20 kHz., respectively, then the 4 kHz. output of the NOR gate is fed into the 16, 12, and 8 kHz. channels continually to reset, if necessary, the flip-flop switching devices to provide positive self-correction and synchronization. Further, the trigger section provides harmonically related synchronized pulse trains without generation and employment sinusoidal waves but by gating and switching, enabling use of non-critical circuit elements.

Figure 3:
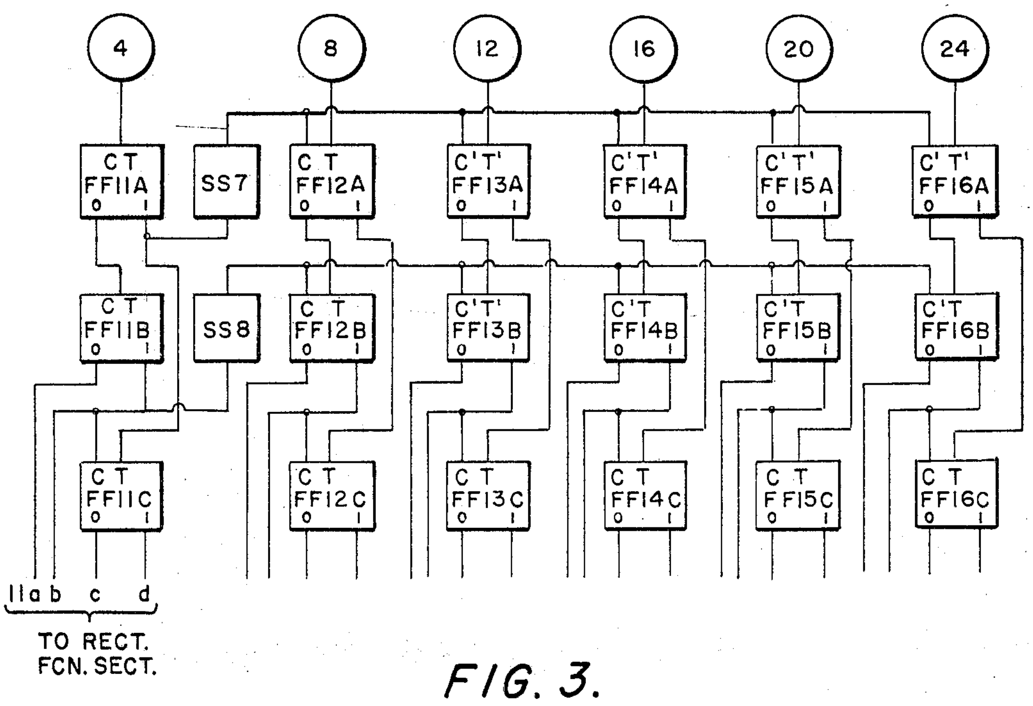
FIG. 3 is a schematic block diagram of the rectangular functions section of the system of the invention.

Reference is now made to FIG. 3, the rectangular functions section 15, which employs switching devices almost exclusively, and only two single-shot delay devices. As shown in FIG. 3, the 4, 8, 12, 16, 20 and 24 kHz. outputs of the trigger section are respectively applied to six channels of the rectangular functions section at trigger inputs T of respective flip-flops FF–11A, FF–12A, FF–13A, FF–14A, FF–15A, and FF–16A.

Each channel in the rectangular functions section 15 has three interconnected flip-flops A, B and C forming a triad the purpose of which is to provide in each channel four rectangular waves related to each other in phase quadrature at ¼ the frequency of the inputs from the trigger section 13. The quadrature relation established in each channel of flip-flops arranged in an A, B, C triad can be seen in the pulse diagram of FIG. 7, in which the subscript *n* generalizes the input frequency of each of the six channels illustratively shown in FIG. 3.

Figure 7:
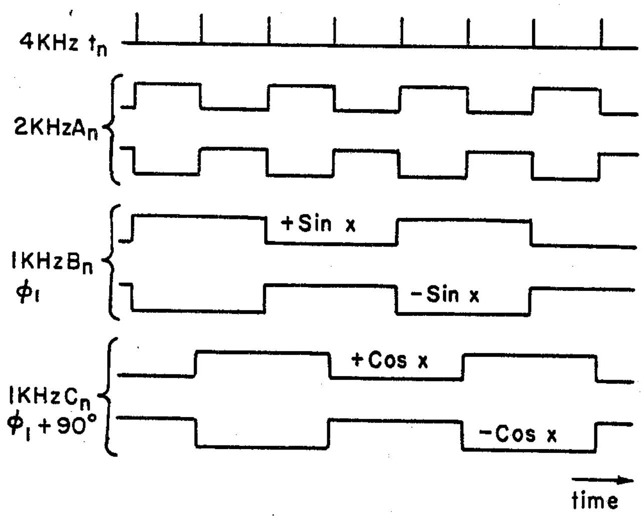

More particularly, taking the 4 kHz. channel as illustrative of all flip-flop triad channels, pulses are applied to triggering terminal T of flip-flop FF–11*a*. The outputs of the legended logic zero and one side of FF–11A will therefore be 2 kHz. pulses 180° out of phase (i.e. of opposite polarity sense) as shown in FIG. 7. The logic zero or "off" output of FF–11A is applied to the trigger side T of flop-flop FF–11B while the logic one or "on" output of FF–11A is applied to the T side of flip-flop FF–11C. The action of flip-flop FF–11B is to further divide the 2 kHz. output of FF–11A by 2, providing 1 kHz. rectangular waves from its logic zero output 180° out of phase with pulses from its logic one output.

As indicated in FIG. 3 the pulses from the logic one and zero outputs of FF–11B provide a first pair of channel outputs 11*a* and 11*b*, separated in phase by 180° that is, of opposite polarity sense.

The logic one output of FF–11A having been applied to the triggering side of FF–11C causes FF–11C to change state at the trailing end of the 2 kHz. pulse. Because the trailing end of the 2 kHz. pulse occurs at a time midway in the 1 kHz. output of FF–11B, the FF–11C is effectively triggered at a point 90° in phase removed from the 1 kHz. output of FF–11B. Therefore the logic one and zero outputs provide channel outputs 11*c* and 11*d* of opposite polarity sense 90° phase separated from outputs 11*a* and 11*b*. Consequently the form outputs 11*a–d* may be considered collectively as providing the following selection instructions for later use: 11*a* for +sin X; 11*b* for −sin X; 11*c* for +cos X and 11*d* for −cos X. That is, because the output of 11*a* is of positive sense in relation to that of 11*b*, the outputs can represent signal instructions corresponding to plus and mins sine functions, and likewise, 11*c* and 11*d* both of which are of opposite polarity sense and of phase 90° removed from 11*a* and 11*b* at 1 kHz., instructions for plus and minus cosine functions.

As further shown in FIG. 3, the logic one of FF–11B is fed to the reset or C input of FF–11C. This connection prevents FF–11C from triggering at a time other than at the negative going trailing edge of the logic one output pulse from FF–11A.

Of course, each of the flip flop triads in the respective channels for the 8, 12, 16, 20 and 24 kHz. pulses operates in the same manner as explained for the 4 kHz. channel flip-flop triad, thus providing ±sine, and ±cosine signal instructions *a*, *b*, *c*, and *d* therein for 2, 3, 4, 5 and 6 kHz., respectively.

The rectangular functions section 15 is self-synchronizing as a unit essentially independently of the trigger section 13 in that the logic one input of FF–11A is connected via a suitable delay device such as single shot multivibrator SS–7 to the respective reset terminals C of flip-flops FF–12A, FF–13A, etc. Synchronization is provided at the B level of each flip-flop triad by coupling the logic one output of FF–11B via a suitable delay at single-shot device SS–8 to the respective reset terminals C of FF–

12B, FF–13B, etc. Finally, synchronization to prevent erroneous triggering of each of FF–12C, FF–13C etc. is provided by coupling the logic one output of FF–12B, FF–13B to the *c* terminal of corresponding flip-flops FF–12C, FF–13C, etc. to effectuate the same result as described for FF–11B and FF–11C.

Figure 4:
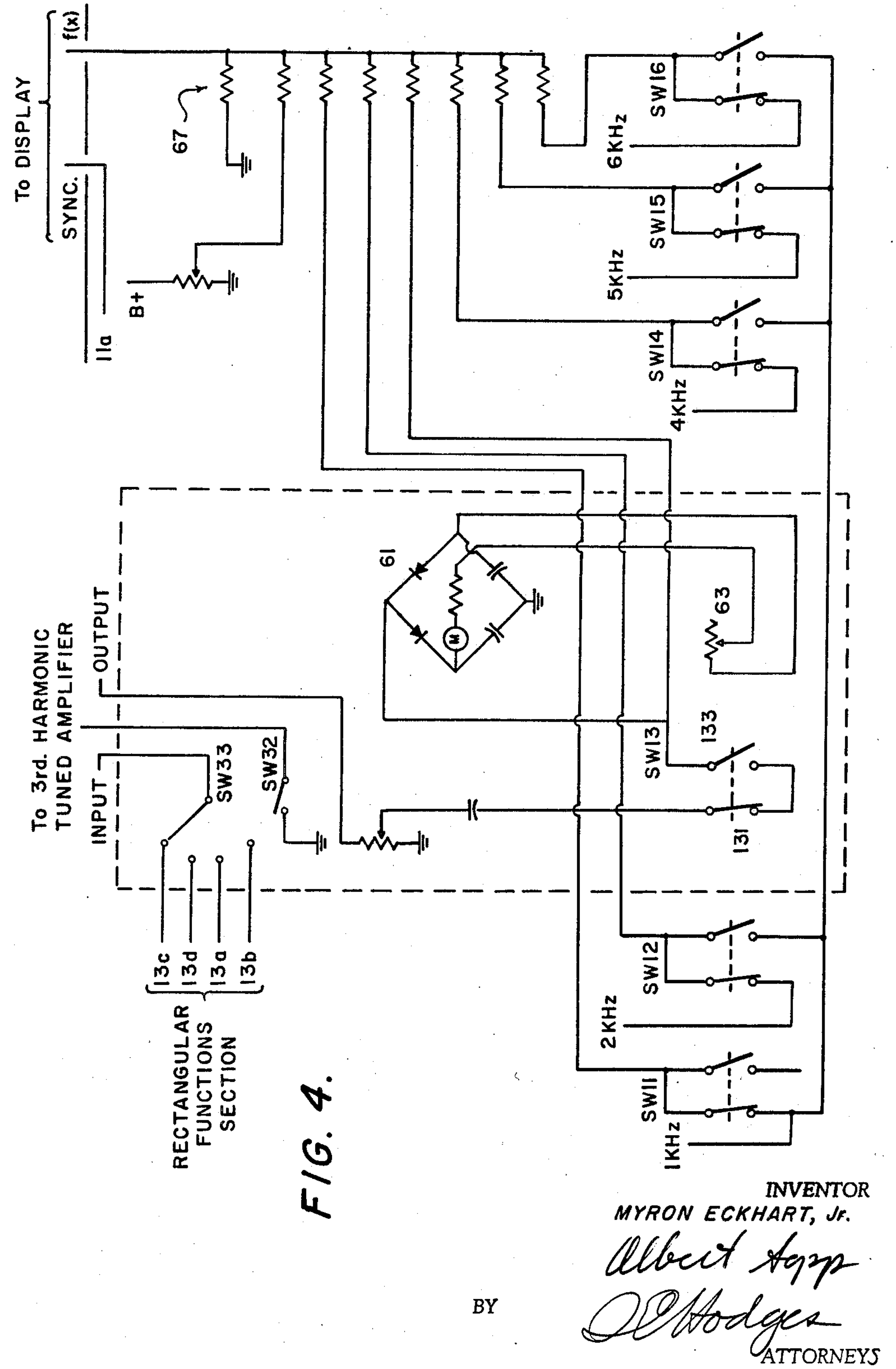
FIG. 4 is a schematic diagram of the control panel portion of the system of the invention.

Referring to FIG. 4, the control section depicted therein includes illustrative portions of system sections 19 and 21. The control panel receives the outputs 11*a, b, c, d,* 12*a, b, c, d,* 13*a, b, c, d,* etc. from the rectangular functions section and selects proper ones of a bank and tuned amplifiers of any suitable well-known construction in section 23 of the system to generate sinusoidal wave components of the Fourier series.

As an illustration the phase quadrature pulse outputs 11*a, b, c* and *d* of the rectangular functions section are shown applied on legended leads in FIG. 4 to contacts of an input selector switch SW–33. If, for example, the Fourier component (±cosine 3X) (at 3 kHz.) is desired as one input to form a complex wave for display, the switch SW–33 is placed in contact with lead 13*c*. Pulses from 13*c* are then fed through SW–33 to a tuned amplifier in system section 23. The tuned amplifier produces a sinusoidal wave cophasally with the phase of the input rectangular wave from 13*c*. The amplitude of the sinusoidal wave from the output of the 3rd harmonic tuned amplifier is adjusted by means of a potentiometer P–3. A gang switch SW–13 has a first contact arm 131 for establishing a circuit with P–3 to couple the sinusoidal output to an output summary bus legended $f(x)$ via a suitable resistance.

There is further provided for each harmonic an amplitude calibration circuit or meter 55. The switch SW–13 has a second contact arm 133 which when moved to engage its contact provides a closed circuit from the 1 kHz. tuned amplifier to the meter 55 and an open circuit with the tuned amplifier output of the higher harmonic channel. If it is assumed that the reference amplitude as established in the calibration meter is 1.0 unit for the 1 kHz. channel, the switches SW–11, SW–12, SW–13 etc. provide means to equalize the calibration of the meters in the respective channels for the harmonics. Depending upon desired amplitude values for the Fourier components of a particular complex wave to be displayed, the amplitude for each channel may be adjusted by means of a potentiometer such as the aforementioned P–3 in the 3 kHz. channel. The calibration circuit or meter 61 may itself be adjusted by means of a potentiometer 63. As an alternative, one meter may be provided for connection thereto with each channel thru appropriate switches, instead of providing one meter for each channel as indicated.

OPERATION

Once the Fourier components have been selected for display of a complex wave, as by appropriate positioning of switches for each channel corresponding to SW–33 for the 3 kHz. or 3rd harmonic whereby the proper sign and trigonometric function is selected, and the amplitude is adjusted, a plurality of Fourier components appears on the $f(x)$ bus providing a summed signal input as voltage across a load resistor 67 to the display device or oscilloscope 25. Sweep control for the device 25 is supplied by the pulses from the 11*a* output of the 4–1 kHz. channel in the rectangular functions section 15.

The summation of the Fourier components providing the output $f(x)$ for display enables a rather faithful rendition of the complex wave because the fundamental and its first five harmonics are available. Additional harmonics may be added according to the principles of the invention, for example, by starting with higher frequency oscillation in oscillator 51, or by multiplying the oscillation frequency.

In carrying out classroom demonstration, the instructor may employ the system of the invention in a variety of ways. For example, each Fourier component can be individually switched into the display device 25 for observation prior to display of the summed components, i.e. the complex wave. Or, the instructor may add one component at a time to pictorially display how each wave component contributes to the final complex wave.

For example, a square wave of the form $$f(x)=A[1.0 \cos x+0.706 \cos 2x+0.334 \cos 3x -0.2 \cos 5x-0.23 \cos 6x]$$

may be demonstrated by first switching only the fundamental thru SW–13 and SW–11 to the display device. Of course, prior to display all channel amplitudes may be checked and calibrated as described above if necessary. Next, the $(+0.706 \cos 2x)$ component may be fed to the display device concurrently with the already present fundamental component $(+10 \cos x)$. The student will see how the second component modifies the first. Next, the $(+0.334 \cos 3x)$ component is summed with the first two, yet further modifying the displayed wave shape so that it becomes more squared.

The above demonstration procedure is then carried out for the $(-.2 \cos 5x)$ and $(-.23 \cos 6x)$ components so that all components together produce a demonstrably observable square wave. Other educational techniques for the system of the invention will be readily apparent to those skilled in the art.

Obviously many modifications and variations of the present invention are possible in the light of the above teachings. It is therefore to be understood that the invention may be practiced otherwise than as specifically described.

What is claimed is:

1. A system for displaying complex waves based on Fourier components comprising:

a source of oscillation;

a trigger section activated by said source and having a plurality of channels therein corresponding to the number of Fourier harmonics to be used for complex wave derivation;

said trigger section having switching means for each channel for establishing pulses therein at a frequency submultiple of the source frequency and harmonically related to the frequencies in the other channels;

a rectangular functions section having essentially the same plurality of channels as said trigger section for deriving phase quadrature related rectangular waves for each submultiple at a frequency one-fourth that of the submultiple;

sinusoidal wave producing means coupled to said rectangular wave producing means for producing, responsive to selected ones of said rectangular functions, sinusoidal waves of predetermined frequency and phase as Fourier components of a complex wave; and means coupled to said sinusoidal wave producing means for displaying a complex wave or one or more of the Fourier components thereof.

2. The system according to claim 1 including means coupled to said sinusoidal wave producing means for adjusting the amplitude coefficients of the selected sinusoidal waves.

3. The system according to claim 1 wherein said rectangular functions section comprises first, second and third flip-flops for each channel;

the first and second of said flip-flops being connected in series to produce as the two outputs of said second flip-flop a first pair of concurrent rectangular waves of opposite polarity sense;

the first, second and third of said flip-flops being connected in series-parallel to produce as the two outputs of said 3rd flip-flop a second pair of concurrent rectangular waves of opposite polarity sense, said first and second pairs of rectangular waves being in phase quadrature.

4. The system according to claim 3 wherein each of said flip-flops has a reset and trigger input and a logic one and logic zero output and wherein:

the trigger input of said first flip-flop is connected to receive the output of a channel of the trigger section;

the second flip-flop is connected to receive at its trigger input the logic zero output of the first flip-flop;

the third flip-flop is connected to receive at its trigger input the logic one output of said first flip-flop and at its reset input the logic one output of said second flip-flop;

the utilized outputs of said flip-flops being the logic one and zero outputs of said second and third flip-flops in parallel.

5. The system according to claim 4 wherein the third flip-flop is connected at its reset input to the logic one output of the second flip-flop.

6. The system according to claim 1 wherein said last named means includes selection means coupled to said rectangular functions section, to said sinusoidal wave producing means and to said display means for selectively activating at least one of said sinusoidal wave producing means in accordance with at least one or more of the outputs of said rectangular functions section to provide at said display means at least one of a plurality of waves.

7. A system for displaying complex waves based on Fourier components comprising:

a source of oscillation;

a trigger section responsive to oscillations from said source for dividing the frequency of said source into a plurality of submultiple frequencies in pulse form;

said trigger section having a plurality of channels, one channel for each submultiple frequency;

means in said trigger section for synchronizing at least one channel thereof responsive to a wave derived from submultiple frequencies of a plurality of other channels;

a rectangular functions section for deriving in response to submultiple outputs from said trigger section phase quadrature-related rectangular waves for each submultiple at a frequency one-fourth that of the submultiple;

a tuned amplifier section having a plurality of tuned amplifiers therein respectively corresponding to the frequencies of the derived rectangular waves;

switch means connected to the rectangular functions section for selectively actuating certain ones of the tuned amplifiers to provide sinusoidal waves of phase and frequency in accordance with the phase and frequency of selected rectangular waves;

amplitude adjusting means coupled to each tuned amplifier for adjusting the amplitude of its sinusoidal output wave;

means connected to said plurality of tuned amplifiers and to said amplitude adjusting means for combining the amplitude adjusted sinusoidal waves to form a desired complex wave; and means for displaying said complex wave.

8. The system according to claim 7 wherein the plurality of submultiple frequencies employed for synchronizing the said at least one channel of said trigger section are the highest two submultiple frequencies of the system.

9. Apparatus for producing from a train of pulses occuring at a frequency evenly divisible by 4 a plurality of rectangular waves at a frequency ¼ the frequency of the pulse train, said rectangular waves thus being related to each other in a phase quadrature sense comprising:

first, second and third flip-flops each having a reset and a trigger input and each having a logic one and logic zero output;

means connecting the trigger input of said first flip-flop to receive the pulse train;

means connecting the trigger input of the second flip-flop to the logic zero output of the first flip-flop;

means connecting the trigger input of the third flip-flop to the logic one output of the first flip-flop; and parallel output means constituting the logic one and logic zero outputs of the second and third flip-flops.

10. Apparatus according to claim 9 including:

means connecting the reset input of the third flip-flop to the logic one output of the second flip-flop.

References Cited

UNITED STATES PATENTS

| | | | |
|---|---|---|---|
| 3,124,884 | 3/1964 | Capecelatro et al. | 35—19 |
| 3,305,675 | 2/1967 | Haase | 328—23 X |
| 3,384,834 | 5/1968 | Treadwell | 328—15 X |

EUGENE R. CAPOZIO, Primary Examiner

W. H. GRIEB, Assistant Examiner

U.S. Cl. X.R.

328—23